United States Patent

[11] 3,628,279

| [72] | Inventor | William Halone<br>776 Sierra View Way, Chico, Calif. 95926 |
|---|---|---|
| [21] | Appl. No. | 26,672 |
| [22] | Filed | Apr. 8, 1970 |
| [45] | Patented | Dec. 21, 1971 |

[54] FISHING LURE RETRIEVER AND METHOD FOR USING SAME
10 Claims, 4 Drawing Figs.

| [52] | U.S. Cl. | 43/17.2, 43/44.9 |
|---|---|---|
| [51] | Int. Cl. | A01k 97/00 |
| [50] | Field of Search | 43/17.2, 44.9 |

[56] References Cited
UNITED STATES PATENTS

| 2,651,132 | 9/1953 | Lennen | 43/17.2 |
|---|---|---|---|
| 2,809,460 | 10/1957 | Taylor | 43/17.2 |
| 3,224,132 | 12/1965 | Frantz | 43/17.2 |
| 3,352,049 | 11/1967 | Agostini | 43/17.2 |
| 668,254 | 2/1901 | Dickinson | 43/44.9 |

FOREIGN PATENTS

| 92,206 | 9/1968 | France | 43/44.9 |
|---|---|---|---|

*Primary Examiner*—Samuel Koren
*Assistant Examiner*—Daniel J. Leach
*Attorney*—Fryer, Tjensvold, Feix, Phillips & Lempio ABSTRACT: A fishing lure retriever comprises a tubular metallic housing defining a tapered bore having a mating, tubular plastic sleeve disposed therein. Overlying longitudinal slits are formed through the housing and sleeve to permit the retriever to be placed onto a fishing line having a snagged lure attached to its free end. When the sleeve is moved axially in the housing, the slit formed on the sleeve closes to prevent the fishing line from escaping. The retriever is then lowered by a recovery cable attached thereto to free the fishing line and attached lure.

PATENTED DEC 21 1971　　　　　　　　　　　　　　　　3,628,279
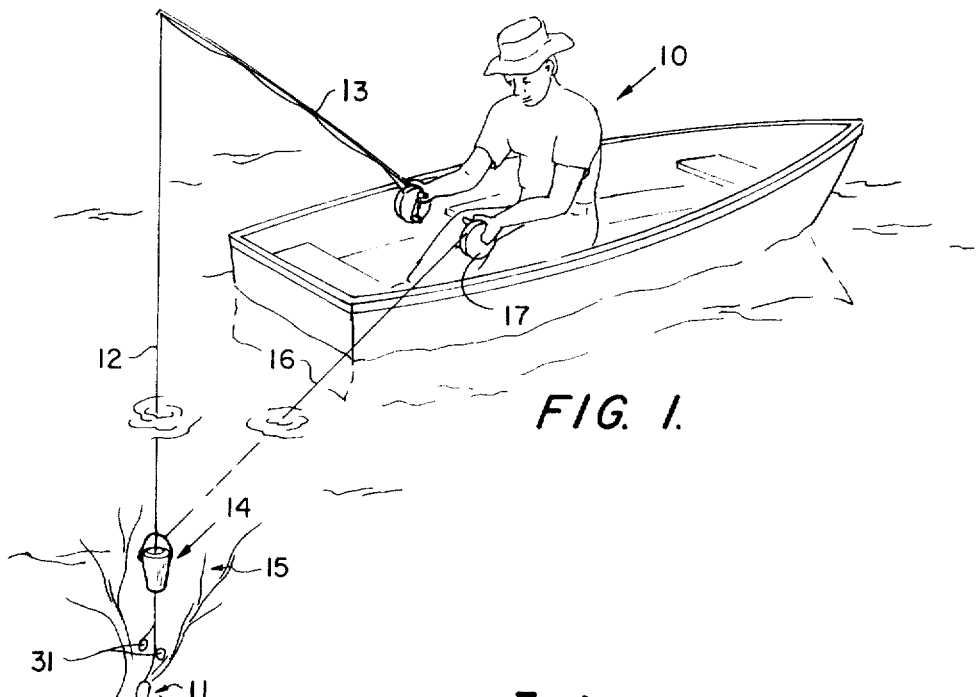
FIG. 1.
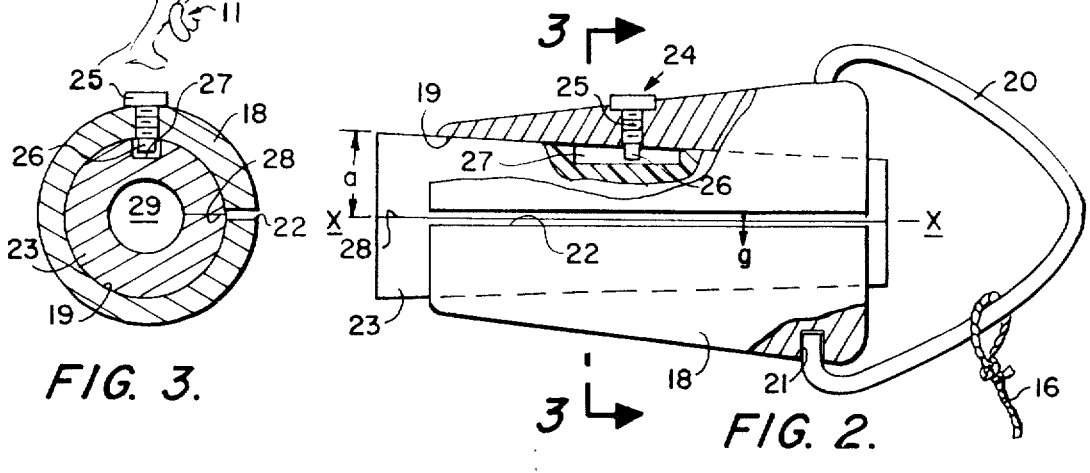
FIG. 3.　　　FIG. 2.
FIG. 4.
INVENTOR.
WILLIAM HALONE

FISHING LURE RETRIEVER AND METHOD FOR USING SAME

The "snagging" problem confronts many fishermen, particularly during trolling or casting operations. Oftentimes the lure or like fishing device and/or a substantial amount of the attached fishing line is lost due to an inability to free same from a broken branch, rock or other submerged object. Conventional attempts to free the lure are generally unsuccessful and normally comprise jerking the fishing line or maneuvering the line to a position whereby the lure may be freed.

An object of this invention is to provide a noncomplex and economical fishing lure retriever exhibiting a high degree of structural integrity and ability to free the lure expeditiously without the aid of additional tools. The retriever is disposed on a longitudinal axis thereof and comprises a tubular member defining a chamber means therein. A normally open slit means is formed through the tubular member to extend in the direction of the axis for permitting a fishing line to be moved therethrough and positioned in the chamber means. Means operatively associated with the member function to selectively close the normally open slit means to retain the fishing line therein during retrieval of a fishing lure.

In the hereinafter described preferred embodiment, the tubular member comprises a flexible plastic sleeve positioned in a weighty, metal housing. Slits are formed through both the housing and sleeve to permit a fishing line to be rapidly positioned interiorly of the sleeve. When the sleeve is moved longitudinally relative to the housing, mating tapered surface portions of the housing and sleeve function to compress the sleeve rapidly to close the slit formed therethrough.

Other objects of this invention will become apparent from the following description and accompanying drawings wherein:

FIG. 1 illustrates a fisherman in the process of retrieving a fishing lure with a fishing lure retriever embodiment of this invention;

FIG. 2 is a partially sectioned, side elevational view of the fishing lure retriever embodiment of FIG. 1;

FIG. 3 is a cross-sectional view taken in the direction of arrows III—III in FIG. 2; and FIG. 4 is a partially sectioned side elevational view of a flexible plastic sleeve employed in the FIG. 2 fishing lure retriever.

FIG. 1 illustrates a fisherman 10 in the process of retrieving a lure 11, attached to a fishing line 12 and fishing pole 13 in a conventional manner. This invention relates to a retriever 14 for expeditiously freeing the lure from a submerged branch 15 or the like. The fisherman may control the raising and lowering of the retriever by means of an attached line or recovery cable 16 adapted to be paidout and retrieved by means of a conventional reel or other suitable shuttle device 17.

Referring to FIGS. 2 and 3, the retriever comprises a tubular metallic housing 18 preferably having a frustoconically shaped bore 19 formed therein. The retriever is disposed on a longitudinal axis X—X thereof with the inner surface portions defining bore 19 preferably being disposed at a small taper angle $a$ (e.g., two degrees) relative to such axis. The housing preferably constitutes a suitably fabricated high density material such as lead or steel.

The weighty (e.g., one to two pounds) housing is preferably conical or otherwise suitably formed to locate the center of gravity $g$ thereof, preferably from one-fifth to one-third of the distance from the top or right end of the retriever toward the left end thereof (FIG. 2). Such a "top-heavy" construction aids in the expeditious and efficient freeing of lure 11 (FIG. 1) by the tumbling action occasioned thereby.

Such weight distribution, whereby the retriever exhibits a lighter front end, facilitates a smooth and uninterrupted descent of the retriever on the fishing line, particularly when it encounters lead weights, swivels or the like attached to the line ahead of the lure. The tapered shape of the housing also aids in penetrating obstacles, such as submerged branch 15.

A bail or like recovery attachment 20 may have its ends pivotally mounted in bores 21 formed in opposite sides of the housing. Retrieving line 16 is attached to the bail, as shown. A flexible metal cable or the like could be secured to housing 18 to be utilized in lieu of the rigid bail. In addition, a slit 22 is formed through the side of the housing and is aligned with axis X—X.

A flexible tubular member or sleeve 23 is mounted in the housing for limited relative axial movement only by retaining means 24. It should be noted that the sleeve may be "standardized" to adapt it for use with housings having varied dimensions and weights for various retrieving applications. Retaining means may comprise a set screw 25 threadably mounted on the housing and having an unthreaded, rounded end 26 engaging a slot 27 formed in the sleeve. Thus, the sleeve will be prevented from rotating, relative to the housing, and is also limited in its relative longitudinal movements along axis X—X (FIG. 2) to prevent removal of the sleeve from the housing.

The outer surface portions of the sleeve are preferably frustoconical and preferably disposed at the same angle $a$ (e.g., 2°) as the surface portions defining tapered bore 19, relative to longitudinal axis X—X. The retriever is shown in its operative or fishing line retaining position in FIG. 2 whereby flexible sleeve 23 is moved fully rightwardly to be compressed radially inwardly towards axis X—X to close a longitudinal slit 28 thereof. The sleeve preferably comprises a suitable plastic material, such as Nylon.

When the sleeve is moved leftwardly, relative to the housing, the slit 28 will open (e.g., one-sixteenth of an inch) to its FIG. 4 position due to its inherent "spring-back" characteristics. The sleeve further defines a chamber means 29 therein which is disposed along axis X—X to positively retain the fishing line 12 therein when closed. The inner surface portions defining a front or inlet end 30 of the chamber means is preferably conically shaped with such surface portions defining an angle $b$ relative to axis X—X.

Such angle is preferably selected from the range of from 20° to 75° (e.g., 30°) to assure that the retriever will freely move downwardly on fishing line 12. For example, such construction will assure that the retriever's descent will not be impeded by swivels, sinkers 31 or the like, attached to the line upstream of lure 11 (FIG. 1). The remaining portion of chamber means 29 preferably diverges away from entrance 30 to afford the chamber means a venturilike configuration.

In operation and when lure 11 has been "snagged," a force is imparted to the right end of sleeve 23 (FIG 2) to move it leftwardly to open slit 28. The retriever is placed over fishing line 16 to entrap the line in chamber 29. A force is then imparted to the left end of the sleeve to move it rightwardly to its FIG. 2 position to thus close slit 28 to positively retain the fishing line in the chamber.

The retriever is then lowered by cable 16 and reel 17 to engage the lure. As soon as the fisherman "feels" such engagement he may jerk line 12 slightly and relax cable 16 to permit the retriever to "tumble." The lure is thereafter recovered by reeling-in cable 16 and line 12.

What is claimed is:

1. A fishing lure retriever disposed on a longitudinal axis thereof and comprising a tubular member defining a chamber means therein, disposed along said axis, for retaining a fishing line therein and sufficiently large to freely permit movement of said member on said line upon radial compression of said tubular member, normally open slit means formed through said tubular member and extending in the direction of said axis for permitting said fishing line to be moved therethrough and into said chamber means, and closing means operatively associated with said tubular member for selectively fully closing said normally open slit means by radially compressing said tubular member for retaining said fishing line therein and for preventing said line from snagging at the slit means.

2. The invention of claim 1 wherein said closing means comprises a weighty tubular metallic housing having said member slidably mounted therein and additional slit means formed through said housing to normally overlie said first-mentioned slit means, and wherein said tubular member comprises a sleeve formed out of a highly flexible material and said member and housing have mating tapered surface portions, relative to said axis, formed internally of said housing and externally of said sleeve, whereby axial movement of said sleeve relative to said housing will function to radially compress said sleeve to close said first-mentioned slit means.

3. The invention of claim 2 further comprising retaining means operatively associated with said housing and said sleeve for preventing said sleeve from rotating relative to said housing and for permitting limited longitudinal movements relative thereto.

4. The invention of claim 2 wherein the weight of said housing is distributed so means for
disposed from one-fifth to one-third of the distance from one end of said housing toward a second end thereof along said axis.

5. The invention of claim 2 wherein said housing is frustoconically shaped and said sleeve has end portions extending past respective end portions of said housing when said sleeve is radially compressed therein.

6. The invention of claim 5 wherein said sleeve is also frustoconically shaped with the bases of said sleeve and housing positioned at opposite ends of said retriever.

7. The invention of claim 2 wherein said chamber means is formed internally of said sleeve and is conically shaped at one end thereof as defined by conically shaped surface portions diverging away from the other end of said sleeve.

8. The invention of claim 2 further comprising a recovery attachment attached to one end of said housing.

9. The invention of claim 8 further comprising a recovery cable attached to said recovery attachment and means for selectively paying-out said cable therefrom.

10. A method for retrieving a fishing lure comprising the steps of
placing a weighted housing having a flexible sleeve slidably mounted therein on a fishing line to position said fishing line internally of said sleeve for freely permitting movement of said sleeve thereon, said housing and sleeve having overlying open slits formed therein to accommodate such placing step,
moving said sleeve axially relative to said housing and simultaneously compressing said sleeve radially to fully close the slit formed therein and to prevent said line from snagging at the slit formed in said sleeve, and
lowering said retriever on said fishing line to engage and free a lure attached to said fishing line.

* * * * *

UNITED STATES PATENT OFFICE
CERTIFICATE OF CORRECTION

Patent No. 3,628,279      Dated December 21, 1971

Inventor(s) WILLIAM HALONE

It is certified that error appears in the above-identified patent and that said Letters Patent are hereby corrected as shown below:

Col. 3, Claim 4, line 2, delete "means for" and insert --that the center of gravity thereof is-- in place thereof.

Signed and sealed this 23rd day of May 1972.

(SEAL)
Attest:

EDWARD M. FLETCHER, JR.
Attesting Officer

ROBERT GOTTSCHALK
Commissioner of Patents